United States Patent Office 3,294,792
Patented Dec. 27, 1966

3,294,792
CERTAIN 1,3,5-OXADIAZINE-ONES AND A
PROCESS FOR THEIR PREPARATION
Gerhard Müller, Leverkusen, and Rudolf Merten,
Cologne-Flittard, Germany, assignors to Farbenfabriken
Bayer Aktiengesellschaft, Leverkusen, Germany, a German corporation
No Drawing. Filed July 1, 1963, Ser. No. 292,085
Claims priority, application Germany, July 21, 1962,
F 37,389
6 Claims. (Cl. 260—244)

The present invention relates to new N-substituted acid amides of the general formula

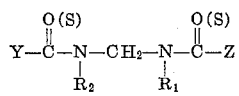

wherein Y is a member of the group consisting of a halogen, a lower alkoxy, a carbamic acid ester, a dialkylamino, a lower alkyl and a lower thioalkyl radical, Z is a member of the group consisting of a halogen, a lower alkoxy and a thioalkyl radical and Y and Z together may be represented by a member of the group consisting of —O— and —S— radicals; wherein $R_2$ is a member of the group consisting of an alkyl having 1 to 8 carbon atoms, a cycloalkyl, a halogenoalkyl, a phenyl, a halogenophenyl, an alkylphenyl radical, a radical of the formula

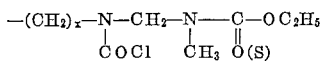

a radical of the formula

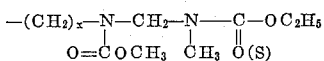

and a radical of the formula

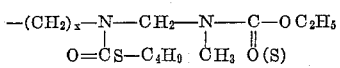

and $R_1$ is a member of the group consisting of hydrogen, a lower alkyl radical, a radical of the formula

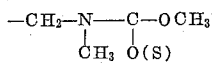

and a radical of the formula

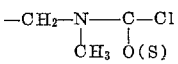

A further object of this invention is a process for producing these new N-substituted acid amides.

The important reactions of which an isocyanate group is capable include addition reactions with compounds containing active hydrogen atoms. Furthermore, addition reactions of isocyanates with acetals and α-chloroalkyl ethers in the presence of catalysts are also known.

It has now been found that N-substituted acid amides and -thio acid amides are obtained in high yields by reacting an acid amide compound of the general formula

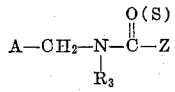

wherein A is a member of the group consisting of a halogen, a lower alkoxy, an alkoxy carbonylamino, a dialkylamino, an acetoxy and a lower thioalkyl radical and Z has the meaning already given above and $R_3$ is a member of the group consisting of hydrogen, a lower alkyl radical having 1 to 8 carbon atoms, a lower alkoxy alkyl and a lower α-halogenalkyl radical with an isocyanate compound of the general formula $R_5[NCO(S)]_n$, wherein $R_5$ is a member of the group consisting of an alkyl having 1 to 8 carbon atoms, a cycloalkyl, a halogenoalkyl, a phenyl, a halogenophenyl and an alkylphenyl radical and $n$ is an integer from 1 to 3.

Either isocyanates or isothiocyanates may be used for the process according to the invention. The same applies to the other reaction components. To avoid unnecessary repetitions in the patent application, the isocyanates and isothiocyanates are termed iso(thio)cyanates. The same applies to the other reaction components and the end products.

In the process according to the invention, the N-(α-functional alkyl)-(thio)-acid amide is added on to the iso(thio)cyanate grouping to form N-substituted (thio)-acid amides according to the following equation given for the particular starting materials indicated.

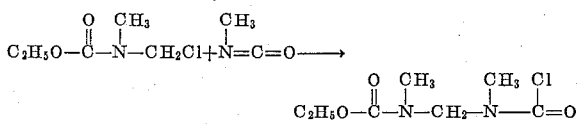

Some of the N-substituted acid amides and thio acid amides may undergo a ring-closure reaction even under the reaction conditions of their production. This consequent reaction is given in the following reaction scheme:

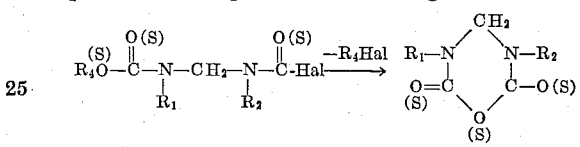

wherein $R_4$ represents an alkyl radical.

Some of the new acid amides and thio acid amides can be subjected to a rearrangement which is given in the following reaction scheme:

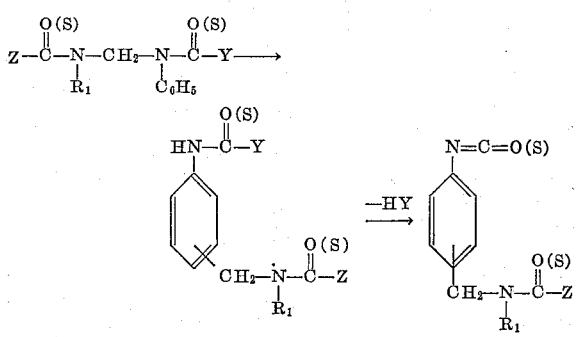

Iso(thio)cyanates within the meaning of the present invention include all aliphatic, cycloaliphatic, araliphatic and aromatic mono- and polyiso(thio)cyanates, as well as mono- and polyiso(thio)cyanates which have been substituted by halogen, such as chlorine or bromine, by nitro groups, cyano, alkoxy, ester or azo groups, and also include acyl- and sulphonyliso(thio)cyanates. The following monoiso-cyanates and isothiocyanates are given by way of example: Alkyl-iso(thio)cyanates such as methyl-, ethyl-, n-butyl, isobutyl, secondary butyl-, octadecyl-, cyclohexylisocyanate and -isothiocyanates, as well as phenyl-, toluyl-, benzyl-, phenylethyl-, 2:4:5-trimethyl-phenyl-, 4-cyclohexyl-phenyl-, diphenylmethane-4-, napthyl-tetrahydronaphthyl-, pyrenyl - 3 - isocyanate and -isothiocyanates. Examples of polyiso(thio)cyanates are: Ethane-, butane-, hexane-, thiodiethyl-, ω:ω'-dipropyl-ether-, heptane-diisocyanates and -diisothiocyanates, aliphatic diisocyanates with incorporated ring systems, such as ω:ω'-diisocyanate - 1:3 - dimethylbenzene, ω:ω'-diisocyanate-1:4-dimethylcyclohexane and ω:ω'-diisocyanate-1:4-diethyl-benzene; hydroaromatic diisocyanates and diisothio-cyanates, such as cyclohexan-1:3-, cyclohexane-1:4-, 1 - methylcyclohexane - 2:4-, dicyclohexylmethane-4:4'-diisocyanate and -diisothiocyanate; mixed aromatic-aliphatic and aromatic-hydroaromatic diisocyanates and diisothiocyanates, such as 4-phenyl-isocyanate-methyliso-cyanate and 4-phenylisothiocyanate-methylisothiocyanate and tetrahydro-naphthalene - 1:5-, hexahydrobenzidine-4:4'- and hexahydrodiphenylmethane-4:4'-diisocyanate and -diisothiocyanate, as well as diiso(thio)cyanates of benzene and its homologues, for example 1:3-phenylene-, 1:4-phenylene-, 1-methylbenzene-2:4-, 1-methylbenzene-2:6-, mono-, di- and tri-isopropylbenzene-diisocyanate and -diisothiocyanates and polyiso(thio)cyanates of naphthalene, of diphenyl, of di- and triphenylmethane, of nolynuclear ring systems or of poly-phenyl compounds. Examples of the last mentioned classes of substances are: Naphthalene-1:4-, naphthalene-1:5-, diphenyl-4:4'-, diphenylmethane-4:4'-, anthraquinone-2:6- and diphenylsulphide-2:4-diisocyanate and -diisothiocyanate, triphenylmethane - 4:4':4''-triisocyanate and -triisothiocyanate, 4:4'-dimethyl-diphenylmethane - 2:2':5:5'-tetraisocyanate and -tetraisothiocyanate and 4:4':4''-triisocyanate-(thio)-phosphoric acid triphenyl ester. The following examples are to be mentioned of substituted mono-and poly-isothiocyanates used according to the invention: halogen substituted, particularly chlorine and bromine substituted, aliphatic and aromatic mono- and polyiso(thio)cyanates, e.g. ω-chloroalkylisocyanates and -isothiocyanates such as 1-chloroethyl-2-isocyanates and -isothiocyanate, 6-chloroethyl-isocyanate and 1-chloro-propyl-3-isocyanate; ω-bromoalkylisocyanates and -isothiocyanates, such as 1-bromoethyl-2-isocyanate and -isothiocyanate, as well as 3- and 4-chloro- and bromo-phenylisocyanate and -isothiocyanates, 3:4-dichlorophenyl and 3:4-dibromophenyl-isocyanate and -isothiocyanates, 1-chlorobenzene- or 1-bromobenzene-2:4-diisocyanate and -diisothiocyanate; nitro-substituted iso(thio)cyanates such as 2-, 3- or 4-nitro-phenyl-isocyanate or -isothiocyanate, 1-nitrobenzene-2:4-diisocyanate and -diisothiocyanate; cyano substituted iso(thio)cyanates such as 1-cyanoethyl-2-isocyanate and -isothiocyanate; alkoxy substituted iso(thio)-cyanates such as methyl ether-propyl-, ethylether-propyl-, isopropylether-propyl-isocyanate and -isothiocyanate, 2-, 3- and 4-methoxyphenyl-isocyanate and -isothiocyanate, 3-methoxy-hexane-diisocyanate, 1-methoxybenzene - 2:4- and -2:5- diisocyanate and -diiso(thio)cyanate. Iso(thio)-cyanates containing ester groups, such as isocyanate-acetic acid ethyl ester, 3-carbethoxyphenylisocyanate and the isothio-cyanate acetic acid ethyl ester may also be used, as well as mono- and polyiso(thio)cyanates which contain one or more azo groups in the molecule, e.g. 4-isocyanate-azobenzene, 4-isothiocyanate - azobenzene, azobenzene-4:4'-diisocyanate and -diisothiocyanate, and compounds which contain isocyanate- and isothiocyanate groups side by side, such as 3-isothiocyanate-phenylisocyanate and 2-methyl - 5 - isothiocyanate - phenylisocyanate. Iso(thio)-cyanates which contain sulphonic groups may also be used in the process according to the invention, e.g. 3-isocyanate-benzene-sulphomethyl-anilide or benzidine sulphonic-4:4'-diisocyanate and -diisothiocyanate. Chlorosulphonyl -and p-toluenesulphonylisocyanate and -isothiocyanate are examples of sulphonyliso(thio)cyanates, and acetyl- and adipolyisocyanate and -isothiocyanate are examples of acyliso(thio)cyanates.

Acid amides of the formula

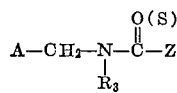

in which A, Z and R₃ have the meaning previously given, are used for reaction with the isocyanates.

The preparation of these compounds is widely known. Compounds of the general formula

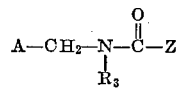

in which A represents halogen, preferably chlorine, and Z represents halogen or an alkoxy radical and R₃ has the meaning already given above may be prepared by splitting hexahydro-s-triazines, Schiff's bases or urotropin with chloroformic acid esters or phosgene (see German patent applications F 34,670 and F 33,106). Such compounds may subsequently be converted into other α-functional alkyl compounds by means of alcohols or alcoholates, amines or mercaptans (see also German patent application F 36,941). It is also possible to obtain compounds in which A and Z represents alkoxy groups in accordance with German Patents 1,072,385 and 1,072,386.

Further known processes for preparing compounds of the general formula given above consist in the reaction of bromine and alkali metal alcoholates with alkoxy acetamides or in the reaction of alkoxy acetic acid azide with absolute alcohol. Hydroxymethyl-carbaminic acid esters may be obtained from carbaminic acid esters and formaldehyde and subsequently converted into alkoxymethylcarbaminic acid esters with alcohols. The preparation of compounds of the formula

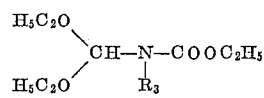

may, for example, be carried out by reacting aliphatic or aromatic isocyanates with orthoformic acid ethyl esters (see German patent application F 34,805).

Another known method is the preparation of compounds of the formula

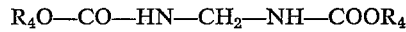

from formaldehyde and carbaminic acid esters

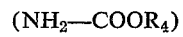

or malonic acid diazides and alcohols.

The praperation of carbaminic acid esters of the formula

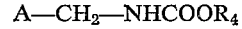

where A==N(R₄)₂ is also known in principle and is carried out by reacting for example dialkylamine in a Mannich reaction with aldehyde and carbaminic acid esters with or without solvents.

In many cases, N-(α-functional alkyl)-(thio)-acid amides of the formula

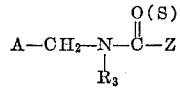

may be reacted with iso(thio)cyanates immediately after they have been produced, without first isolating them.

The reaction between N-(α-functional alkyl)-(thio)-acid amides and iso(thio)cyanates may be carried out directly, but it is advisable to add catalysts, such as are used in anhydrous form for the Friedel-Crafts reaction.

The following may be mentioned as examples of such catalysts: Anhydrous organic and inorganic acids such as sulphuric acid, phosphoric acid, perchloric acid, hydrogen halides, fluorosulphonic acid, chlorosulphonic acid, trichloroacetic acid, methane sulphonic acid, toluenesulphonic acid, commercial sulphonic acid mixtures of aliphatic or aromatic type, e.g. sulphonic acid group substituted polymers based on polystyrene which may, if desired, be cross-linked with polyvinyl compounds, or phenol-formaldehyde condensates; anhydrous metallic or non-metallic halides which function as Lewis acids, such as boron trifluoride and its addition products with ether, acetic acid etc.; boron trichloride, phosphoric halides, phosphorus oxyhalides, aluminium chloride, zinc chloride, tin-IV-chloride, iron-III-chloride, antimony-V-chloride, chromium-III-chloride and others. BF₃ and its addition products and zinc chloride are preferably used.

The quantity of catalyst that may be required depends on the kind of reaction components and may vary within wide limits. To avoid side reactions, the quantity of catalyst will be kept as low as possible. The quantities generally used are 0.1 to 30%, preferably up to 20% of catalyst calculated on the reaction components.

The proportions of iso(thio)cyanate and N-(α-functional alkyl)-(thio)-acid amide may be varied greatly, for example on the basis that the (thio)-acid amide used contains several functional groups in the molecule suitable for reaction or that the iso(thio)cyanate components used contain several iso(thio)cyanate groups in the molecule. The starting materials will generally be used in equivalent quantities except where one reaction component is regarded as particularly valuable and therefore the other component is to be used in a relative excess so that the valuable component will be reacted to completion as far as possible. To carry out the reaction, the components are added together as far as possible under anhydrous conditions in some cases in the presence of catalysts. The reaction takes place at temperatures of about —10 to +120° and is generally complete after several hours. In some cases, it may be advantageous to use inert solvents such as aliphatic, aromatic or chlorinated hydrocarbons, esters or ketones, e.g. cyclohexane benzene, a chlorobenzene, a carbon tetrachloride, glycol-monoethylether acetate and acetophenone. The products are worked up by the usual methods, e.g. by distillation or crystallisation, after removal of the catalyst where necessary.

The new acid amides thus obtained still contain functional groups and may be used as intermediate products, e.g. for the preparation of dyestuffs and plant protecting agents.

The compounds obtained by the process of the invention possess herbicidal properties. Water plants, e.g. Elodea, Myriophyllum and Vallisneria are exterminated by e.g. the compounds

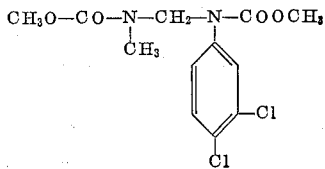

and

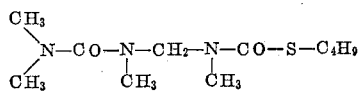

in a concentration of 5 p.p.m. The compound,

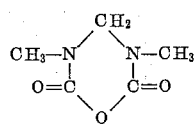

e.g., brings about an evident retardation in the growth of mustard plants when used in a quantity of 40 kg./ha. If millet plants are sprayed with a dispersion of the same compound, using the same quantity per ha., the plants are partially destroyed. This shows a selective herbicidal action.

The invention is illustrated by the following examples.

Example 1

152 parts by weight of N-chloromethyl-N-methyl-carbaminic acid ethyl ester are added so slowly, drop by drop, to a suspension of 5 parts by weight of anhydrous zinc chloride in 57 parts by weight of methylisocyanate at room temperature that the temperature does not rise above 30°. During the addition of this component, the zinc chloride goes into solution. The reaction mixture is then left to continue to react for another 8 hours at room temperature. A substance in the form of colourless crystals is obtained, which has the structure of a cyclic carbaminic acid anhydride of the formula

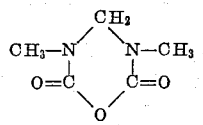

M.P. 132° (from dioxane). Yield: 90 parts by weight. In addition, 47 parts by weight of a pale brown, viscous liquid which consists mainly of a carbaminic acid chloride of the structure

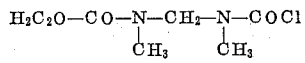

are obtained. If 168 parts by weight of N-chloromethyl-N-methyl-thiocarbaminic acid ethyl ester is used instead of the carbamic acid ethyl ester there is obtained a cyclic carbamic acid anhydride of the formula

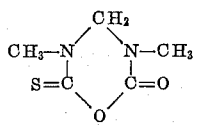

Example 2

38 parts by weight of the reaction product of N-chloromethyl-N-methyl-carbamidic acid chloride with 1 mol sodium ethylate are added dropwise in the course of one hour to a suspension of 2.5 parts by weight of anhydrous zinc chloride in 14.5 parts by weight of methylisocyanate. During this addition, the reaction temperature rises from 20 to 60° and the zinc salt goes into solution. The reaction mixture is maintained at 40° for another 8 hours. The reaction product consists of 23 parts by weight of the cyclic carbaminic acid anhydride of melting point 132°, described in Example 1, and 11 parts by weight of a viscous brown liquid which again consists mainly of the carbaminic acid chloride mentioned there.

Example 3

In a manner similar to that of Example 1, the cyclic carbaminic acid anhydride of the structure

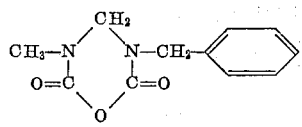

is obtained in quantitative yield by reacting 27 parts by weight of benzyl isocyanate and 31 parts by weight of N-chloromethyl-N-methylcarbaminic acid ethyl ester in the presence of 2.5 parts by weight of anhydrous zinc chloride at 50°. Melting point 128 to 130°.

Example 4

By reacting 90 parts by weight of N-chloromethyl-N-isobutyl-carbaminic acid methyl ester with 29 parts by weight of methylisocyanate in the presence of 5 parts by weight of anhydrous zinc chloride at 60°, 40 parts by weight of a cyclic carbaminic acid anhydride of the structure

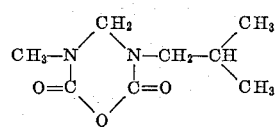

are obtained in a manner corresponding to Example 1. Melting point 80 to 83°. In addition, 54 parts by weight of a liquid reaction product is obtained which consists mainly of carbaminic acid chloride of the structure

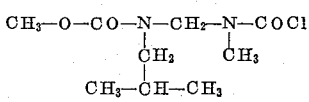

Example 5

38 parts by weight of N-chloromethyl-N-methyl-carbaminic acid ethyl ester are added dropwise in the course of one to two hours to a suspension of 2.5 parts by weight of anhydrous zinc chloride in 27 parts by weight of β-chloroethyl-isocyanate. The temperature rises to a maximum value of 33 to 35° and the zinc salt goes into solution. The reaction is left to continue for 9 hours at 60° and 53 parts by weight of a viscous pale brown liquid consisting of a carbaminic acid chloride of the structure

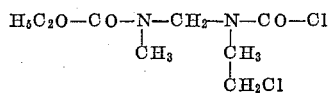

are obtained.

Example 6

76 parts by weight of N-chloromethyl-N-methyl-carbaminic acid ethyl ester are added drop by drop in the course of about 3 hours to 82 parts by weight of 6-chlorohexyl-isocyanate and 5 parts by weight of anhydrous zinc chloride. During this addition, the zinc salt dissolves and the temperature of the reaction mixture rises from 23° to the maximum value of 35°. The reaction is left to continue for another 6 hours at 60° when 148 parts by weight of a viscous red liquid are obtained which consists of a carbaminic acid chloride of the structure $$Cl-(CH_2)_6-N-CH_2-N-COOC_2H_5$$
$$\overset{|}{COCl} \quad \overset{|}{CH_3}$$

Example 7

67 parts by weight of N-methoxymethyl-N-methyl-carbaminic acid methyl ester are added drop by drop in the course of 2 hours to a suspension of 5 parts by weight of anhydrous zinc chloride in 29 parts by weight of methyl isocyanate. The zinc salt is thereby dissolved and the reaction temperature rises from 20° to 50 to 60°. The reaction is left to continue for 5 hours at room temperature and the reaction mixture is then worked up by stirring it into 200 ml. of 3% sodium hydroxide, the mixture is then shaken with benzene and the solvent is removed. 89 parts by weight of a liquid colourless reaction product remains behind. This product boils at 122 to 123° at 50 mm. Hg and consists of N:N'-dimethylmethylene-di-carbaminic acid methyl ester. Yield: 80 parts by weight. The reaction product crystallises on cooling.

Example 8

75 parts by weight of N-diethylaminomethyl-carbaminic acid ethyl ester are added drop by drop in the course of 3 hours to a solution of 5 parts by weight of BF$_3$-etherate in 25 parts by weight of methylisocyanate under reflux conditions but below 80°. During this process, the boiling temperature rises from 40° to 70° and more. The reaction is left to continue for another 6 hours at 80° and the product is worked up as described in the preceding example. 73 parts by weight of a viscous liquid are left behind. This crude product is distilled in vacuo and yields 40 parts by weight of a urea derivative of the structure

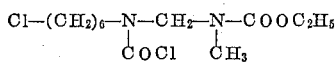

which boils at 115 to 130° at 0.12 mm. Hg after redistillation. $n_D^{20}$: 1.4672.

Example 9

67 parts by weight of N-methoxymethyl-N-methyl-carbaminic acid methyl ester are added drop by drop in the course of 2 hours at 50° to a solution of 94 parts by weight of 3:4-dichlorophenylisocyanate and 2 parts by weight of BF$_3$-etherate in 100 parts by weight of anhydrous cyclohexane. The reaction is left to continue for 4 hours at 50°, the reaction solution is shaken three times with 100 parts by weight of 3% sodium hydroxide solution and once with 100 parts by weight of water, and the solvent is removed. The viscous reaction product, obtained in a quantity of 127.5 parts by weight, is distilled in vacuo and yields 93 parts by weight of N-methyl-N'-(3:4-dichlorophenyl)-methylene-di-carbaminic acid methyl ester of the formula

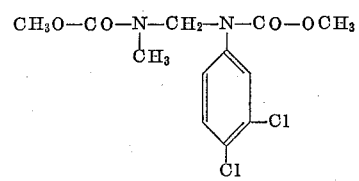

which, on redistillation, boils at 169 to 172° at 0.5 mm. Hg. $n_D^{20}$: 1.5425.

Example 10

76 parts by weight of N-chloromethyl-N-methyl-carbaminic acid ethyl ester are added drop by drop in the course of 2–3 hours to a suspension of 5 parts by weight of anhydrous zinc chloride in 60 parts by weight of phenylisocyanate at 0–10°. The reaction is left to continue for 3 hours at 0–10° and for another 8 hours at room temperature, 115.5 parts by weight of a red solution which is at first viscous but crystallises completely in a short time is obtained as reaction product. This is a mixture of the following carbamide acid chlorides:

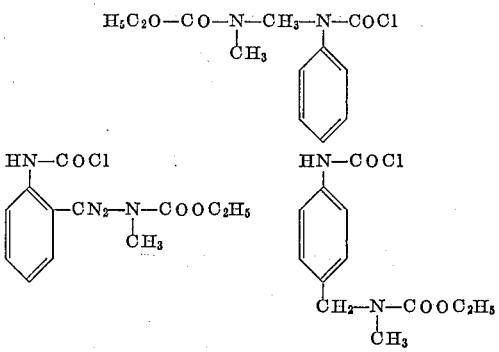

When the mixture of the carbamide acid chlorides is distilled, partial decomposition takes place and a mixture of the two isocyanates.

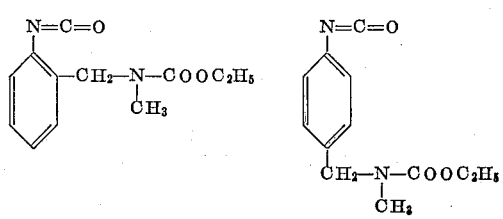

is obtained. $n_D^{20}$: 1.5209; B.P. 103–108° at 0.1 mm. Hg.

Example 11

A mixture of 200 parts by weight of phenylisothiocyanate and 76 parts by weight of N-chloromethyl-N-methylcarbaminic acid ethyl ester is treated in separate portions with 10 parts by weight of anhydrous aluminium chloride and then heated at 80° for 6 hours. The reaction solution is then shaken with water, the excess phenylisothiocyanate is distilled off in vacuo and the reaction product is distilled. 18 parts by weight of a mixture of the two isothiocyanate urethanes

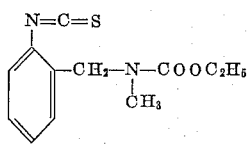 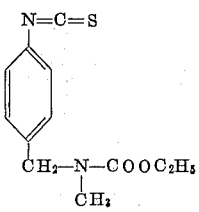

are obtained. B.P. 140–145° at 0.15 mm. Hg, $n_D^{20}$: 1.5830.

Example 12

152 parts by weight of N-chloromethyl-N-methylcarbaminic acid ethyl ester are added drop by drop in the course of 3 hours to a mixture of 84 parts by weight of hexamethylene-diisocyanate and 5 parts by weight of anhydrous zinc chloride. The zinc salt is thereby dissolved and the temperature rises from 22° to 39°. The reaction mixture is maintained for another 6 hours at 50°. 234 parts by weight of a viscous colourless liquid are obtained. This liquid consists of carbaminic acid chloride of the structure

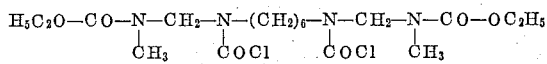

$n_D^{20}$: 1.4759.

Example 13

29 parts by weight of methylisocyanate are added drop by drop in the course of 2 hours to a solution of 95 parts by weight of methylene-di-carbaminic acid ethyl ester and 15 parts by weight of BF$_3$-etherate in 200 parts by weight of anhydrous benzene at 60°. The reaction solution is kept for another 10 hours under reflux, the temperature slowly rising to 80°. The product is worked up by shaking it several times with water and removing the solvent. 65 parts by weight of viscous residue are obtained, from which 6 parts by weight of methylene-dicarbaminic acid ethyl ester separate out after being left to stand for some time. This product, which has the melting point of 132°, is removed by suction and filtration. The yellow viscous filtrate is an acyl urethane of the structure

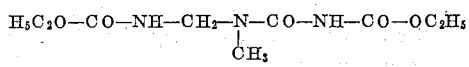

Example 14

44 parts by weight of N-acetoxymethyl-N-methylcarbaminic acid ethyl ester are added drop by drop in the course of one hour to a suspension of 2.5 parts by weight of zinc chloride in 14.5 parts by weight of methyl isocyanate. The reaction mixture is kept for another 4 hours at 50°. The product is worked up by stirring it into 100 parts by weight of 5% sodium hydroxide, shaking it with benzene and removing the solvent. The residue is distilled in vacuo. 18 parts by weight of a compound of the structure

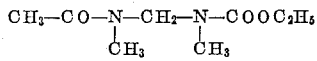

are obtained. B.P. 140–153° at 15 mm. Hg. $n_D^{20}$: 1.4512.

Example 15

82 parts by weight of N:N-dimethoxymethyl-carbaminic acid methyl ester are added drop by drop in the course of 3 hours under reflux conditions but below 70° to a suspension of 57 parts by weight of methylisocyanate and 5 parts by weight of anhydrous zinc chloride. The reaction is left to continue for another 4 hours at 70°, and 143 parts by weight of a colourless viscous addition product are obtained. This product is assumed to have the structure

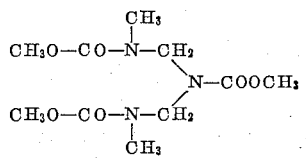

Example 16

81 parts by weight of N-chloromethyl-N-methylcarbaminic acid ethyl ester are added drop to drop in the course of one hour at room temperature to a suspension of 75 parts by weight of chlorosulphonyl-isocyanate and 5 parts by weight of anhydrous zinc chloride. During this process, the zinc salt goes into solution and the temperature of the reaction mixture rises from 22° to 27–28°. The reaction is then left to continue for 7½ hours at 60°. 157 parts by weight of a pale yellow easily mobile addition product assumed to have the structure

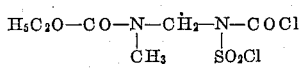

are obtained.

Example 17

81 parts by weight of N-ethoxymethyl-N-methylcarbaminic acid ethyl ester are added drop by drop in the course of 1–2 hours at room temperature to a suspension of 5 parts by weight of anhydrous zinc chloride in 53 parts by weight of β-chloroethyl-isocyanate. During this process, the zinc chloride dissolves and the reaction temperature rises from 22° to 35°. The reaction mixture is maintained at 50° for another 4 hours and then diluted with 200 ml. benzene and then shaken several times with water. After evaporation of the solvent, 76 parts by weight of a colourless liquid residue remain. When distilled in vacuo, this residue yields 20 parts by weight of N-methyl-N'-(β-chloroethyl)-methylene-dicarbaminic acid ethyl ester of the structure

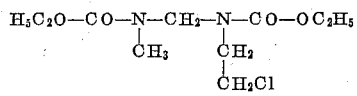

B.P. 110° at 0.07 mm. Hg. $n_D^{20}$: 1.4593.

Example 18

76 parts by weight of N-chloromethyl-N-methyl-carbaminic acid methyl ester are added at such a rate to a suspension of 5 parts by weight of anhydrous zinc chloride in 63 parts by weight of cyclohexylisocyanate at 0–5° that the temperature does not rise above 10°. The reaction is then left to continue for another 4 hours at 0–10°, 8 hours at room temperature and 10 hours at 50°. 134 parts by weight of reaction solution are obtained, from which, after removal of the easily volatile components in vacuo, 59 parts by weight of carbamide acid chloride of the structure

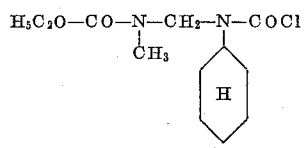

are obtained, which crystallises out after prolonged standing.

Example 19

11 parts by weight of N-dimethylaminomethyl-N-methyl-carbaminic acid thio-n-butyl ester are added drop by drop in the course of ½ hour to a solution of 0.5 part by weight of BF$_3$-etherate in 3 parts by weight of methyl isocyanate under reflux conditions but below 80°. The reaction is maintained for another 3 hours at 80° and the product is then worked up by stirring it into 50 parts by weight of 5% sodium hydroxide, shaking with benzene and removing the solvent. The residue is distilled in vacuo. 7 parts by weight of an addition product of the formula

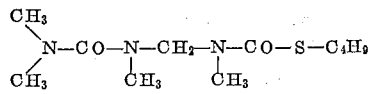

are obtained. B.P. 142–146° at 0.155 mm. Hg. $n_D^{20}$: 1.5047.

*Example 20*

14.5 parts by weight of methylisocyanate are added drop by drop to a solution of 5 parts by weight of $BF_3$-etherate in 43 parts by weight of formaldehyde-di-n-butyl mercaptal under reflux conditions but not above 80°. The reaction is left to continue for another 3 hours at 80° and the product is then worked up as described in the preceding example and distilled in vacuo. After repeated rectification, 9 parts by weight of a compound of the structure

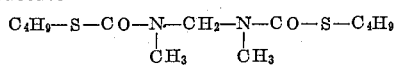

are obtained. B.P. 155–157° at 0.1 mm. Hg. $n_D^{20}$: 1.5172.

We claim:
1. A member selected from the group consisting of N-substituted acid amides of the following formula:

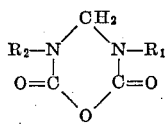

wherein $R_1$ is a member selected from the group consisting of hydrogen and lower alkyl and $R_2$ is a member selected from the group consisting of lower alkyl and phenyl-lower-alkyl.

2.

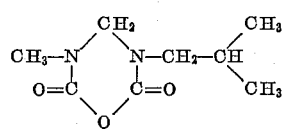

3.

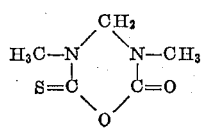

4. A process for preparing N-substituted amides having the formula

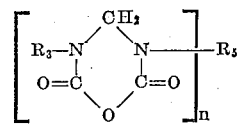

which comprises reacting an acid amide of the formula:

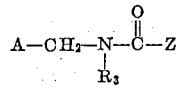

wherein A is a member selected from the group consisting of halogen, lower alkoxy, alkoxy carbonylamino, dialkylamino, acetoxy, lower thioalkyl, Z is a member selected from the group of halogen, lower alkoxy and thioalkyl and $R_3$ is a member selected from the group consisting of hydrogen, lower alkyl having 1 to 8 carbon atoms, lower alkoxy alkyl and lower α-halogen alkyl with an isocyanate having the formula $$R_5[NCO]_n$$

wherein $R_5$ is a member selected from the group consisting of cycloalkyl, alkyl having 1 to 8 carbon atoms, halogenoalkyl, phenyl, halogenophenyl, and alkylphenyl, and $n$ is an integer of from 1 to 3, at a temperature of from about −10 to +120° C. in the presence of a catalyst and under anhydrous conditions.

5. Process according to claim 4, which comprises effecting said reaction in an anhydrous inert liquid organic medium.

6. Process according to claim 4, wherein said catalyst is a Friedel-Crafts catalyst.

References Cited by the Examiner
UNITED STATES PATENTS

| | | | |
|---|---|---|---|
| 2,680,767 | 6/1954 | Snell et al. | 260—561 |
| 2,844,629 | 7/1958 | Bruce et al. | 260—561 |
| 3,030,362 | 4/1962 | England | 260—244 |
| 3,122,537 | 2/1964 | Trepanier | 260—244 |

WALTER A. MODANCE, *Primary Examiner.*
NICHOLAS S. RIZZO, *Examiner.*
R. T. BOND, *Assistant Examiner.*